March 28, 1950   D. SILVERMAN   2,501,791
INKLESS RECORDER

Filed Aug. 10, 1944   2 Sheets-Sheet 1

Inventor:—
Daniel Silverman
By Everett A. Johnson
Attorney

March 28, 1950 — D. SILVERMAN — 2,501,791
INKLESS RECORDER
Filed Aug. 10, 1944 — 2 Sheets-Sheet 2
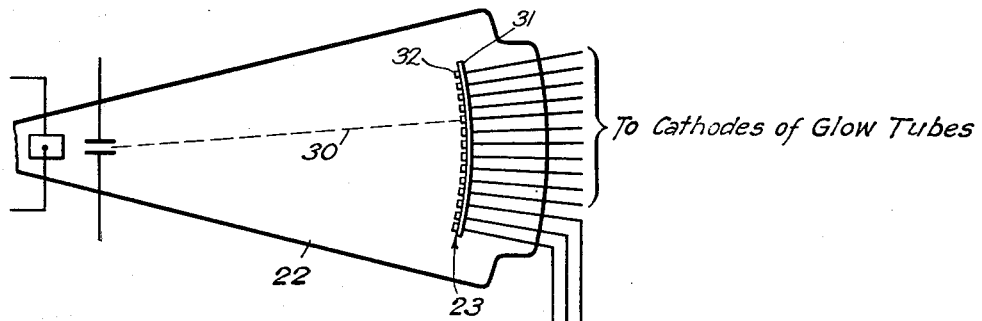
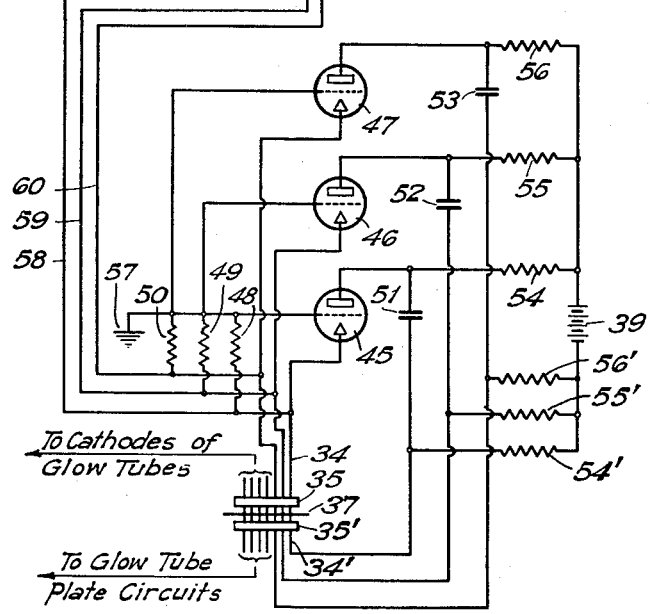
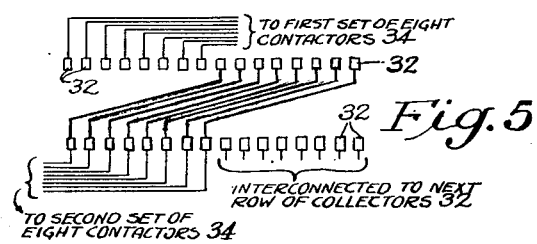
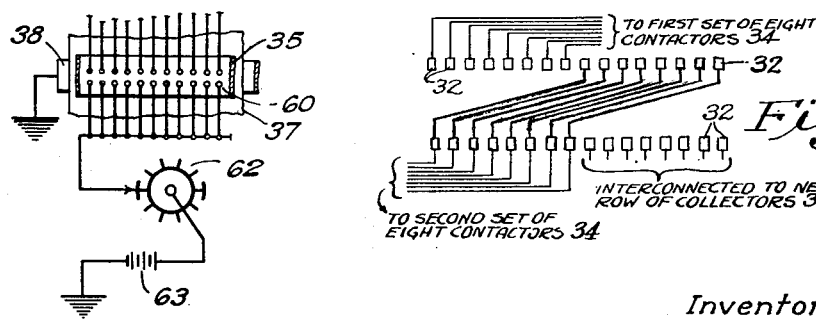
Inventor:—
Daniel Silverman
By Everett A. Johnson
Attorney Patented Mar. 28, 1950

2,501,791

UNITED STATES PATENT OFFICE 2,501,791

INKLESS RECORDER

Daniel Silverman, Tulsa, Okla., assignor to Stanolind Oil and Gas Company, Tulsa, Okla., a corporation of Delaware Application August 10, 1944, Serial No. 548,887

5 Claims. (Cl. 346—33)

This application pertains to the art of electric recording and is particularly applicable to the recording of rapid electric variations on a moving strip of paper by means of which a permanent visual record is obtained.

Most types of electrical recording instruments provide either for photographic or pen recording. Each of these types has certain advantages and disadvantages which govern the applications for which it is suitable. The photographic type recording in the past has permitted greatest sensitivity and rapidity of recording, while the moving pen type of recording instrument produces a record much more slowly but one which is visible from its inception and without the need for employing the somewhat complicated and always expensive methods of photographic development. In a number of different applications such as seismic surveying operations, it would be extremely advantageous to be able to have an electrical recorder which would combine the major advantages of the two systems, i. e., the sensitivity and recording speed of the photographic type recording with the immediate availability and simplicity of the recording process in the pen type recorder, without the need of photographic processing.

It is an object of this invention to provide an electric recording system combining the major advantages of both the photographic type recorder and the pen type recorder. Another object of this invention is to provide an electrical recording apparatus by means of which the variations in motion of an electrical indicator such as a galvanometer are translated into a coordinated series of time pulses of electricity selectively applied to one of a plurality of stationary contactors, each adapted to produce a visual indication in the form of a dot or small mark upon a moving strip of record paper. A still further object of this invention is to provide an approximately simultaneous recording of the deflection from one or a plurality of galvanometers upon a moving strip of non-shielded paper (i. e. from which light is not excluded) rapidly and as a function of time, so that on the present resultant record the variations in deflections of the galvanometer or galvanometers may be determined to the order of the nearest 0.001 second.

Further objects and corresponding advantages of my invention over the prior art will be apparent as the description thereof proceeds with reference to the drawings.

The attached sheets of drawings illustrate various embodiments of my invention which are included for ease of explanation of the principles involved. But it is not intended that the invention be limited thereby, the particular embodiments being set forth only for the purpose of illustration. In the various figures a given reference numeral refers to similar or corresponding elements.

Figure 3 illustrates a modification of the recording apparatus in which timing marks are applied to the record.

Figure 4 represents a portion of detailed apparatus which is a desirable alternative for the switching system shown in Figure 1.

Figure 5 illustrates a modification of the scanning apparatus to accommodate deflections of large amplitude.

Figures 1, 2:
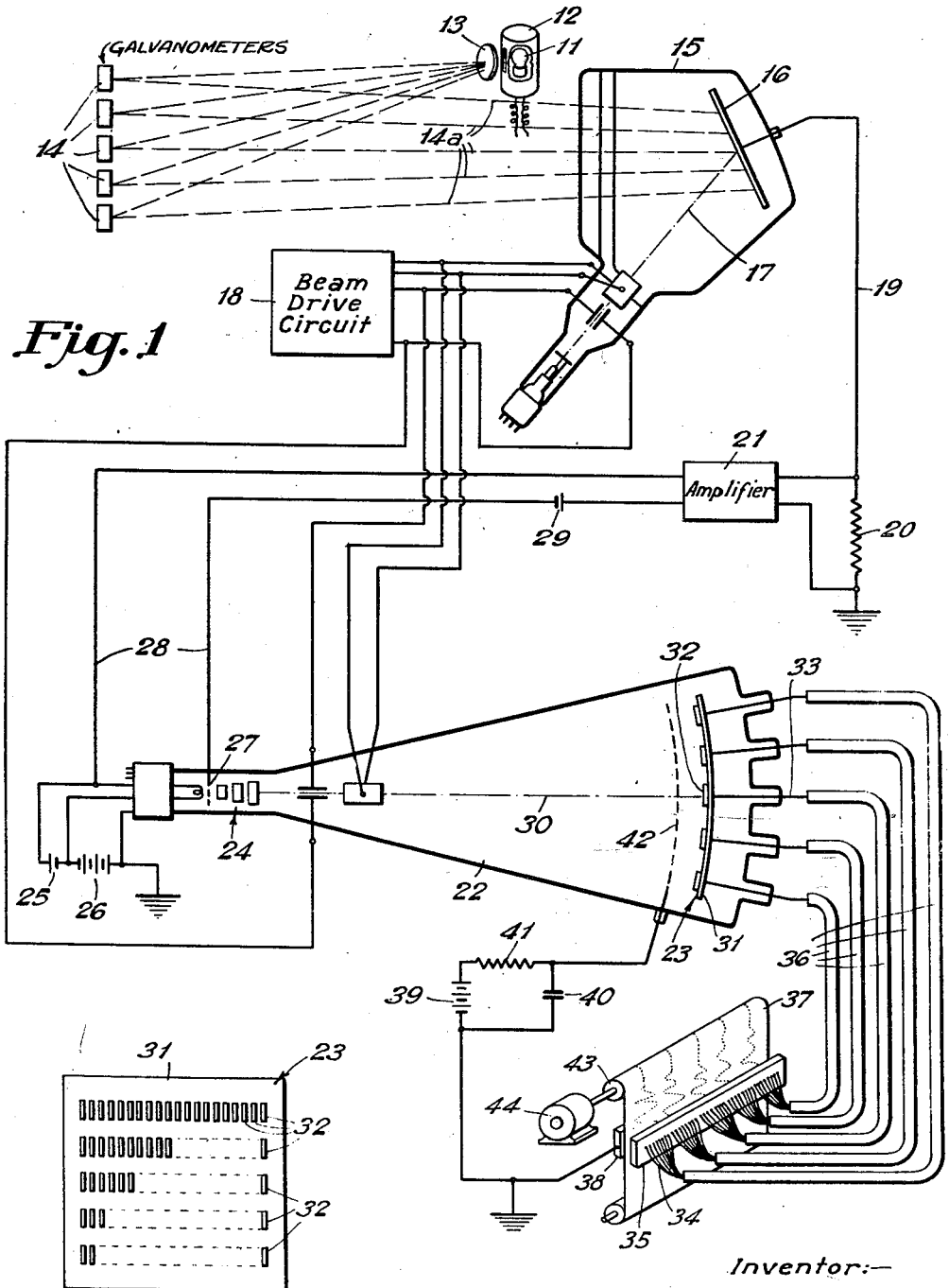
Figure 1 illustrates one embodiment of my invention, as applied to the recording of the deflection of one or a plurality of galvanometers.
Figure 2 is an enlarged detail of a portion of the recording apparatus shown in Figure 1.

Essentially the recording apparatus includes a means for producing a light beam, means on a galvanometer for deflecting the light beam in accordance with the electric signal which is to be recorded, a switching system (which includes scanning means), a selector system, and the recording system proper. Recording is made on a voltage-sensitive moving strip of paper. Such a paper is defined as that which changes a visual characteristic upon the passage therethrough of electric current. Thus, for example, ordinary paper without any treatment whatsoever can be used in this system if spark recording is used, i. e. if a high current is passed through the paper to burn, discolor, or make a sharp hole. I prefer to use a special paper manufactured by the Western Union Company and called "Teledeltos" paper. This paper, or its equivalent, produces a definite dark mark against a much lighter background on its surface whenever a voltage is applied between two conductors touching the paper surfaces. Thus, if two electrodes are placed on opposite sides of and in contact with the surfaces of a strip of "Teledeltos" paper, one of which electrodes is of small diameter, a voltage surge applied between these two electrodes will produce a dark dot.

For the recording system, I propose to use a plurality of spaced electrical contactors which are aligned in a direction substantially perpendicular to the motion of the recording strip. These contactors are small in diameter, are spaced closely together, but are insulated from each other. These are mounted on one side of the strip, and on the other side is at least one backing plate (more could be used if desired). A pulse of current is applied between a selected one of the contactors and backing plate periodically. The particular contactor to which this pulse is applied depends upon the galvanometer deflection and changes therewith. Thus, a record is produced using stationary recordling members (the contactors and backing pate), producing a series of dots on the moving Teledeltos strip, the switching mechanism serving to select automatically and periodically the one of the aligned contactors to which the current pulse is applied.

Referring now to Figure 1, light from a light source 11 is permitted to escape through a slit in light shield 12, in front of which is placed a lens 13. This light is directed on at least one of the mirrors of a plurality of galvanometers 14 which are connected by the usual conductors (not shown) to sources of electric signals which may, for example, be the amplifier channels in a seismograph recording system or the like. The galvanometers 14 are so oriented with respect to the light source 11 that the light beams reflected from the galvanometer mirrors fall along different and approximately parallel paths 14a. A television scanning tube such as an Iconoscope 15 is placed in the paths of light beams 14a at such a distance that concentrated spots of light are formed on the mosaic screen 16 of the Iconoscope. The Iconoscope 15 is furnished with the customary voltage sources (not shown) to form an electron scanning beam 17, in a manner well known in the art. A simple beam drive circuit 18, such as is described in Zworykin and Morton's "Television," John Wiley and Sons, Inc., 1940, pages 455 to 460, is employed to cause the electron beam 17 to scan the mosaic screen 16. The only requirements on this beam drive circuit are that it causes the electron beam 17 to scan successively the parallel zones on the mosaic 16, which could be occupied by the spots of light reflected from the mirrors of galvanometers 14. These zones are relatively long in a direction normal to the plane of Figure 1.

The signal lead 19 from the Iconoscope mosaic screen 16 is grounded through a resistance 20, so that the change in signal due to the scanning of the deflected spot from any galvanometer appears across this resistance. This signal is amplified by amplifier 21.

A special electron tube 22 is used as a selector system. This electron selector tube is in the form of a cathode-ray oscilloscope fitted with a special connector screen 23, the construction of which is shown in greater detail in Figure 2. The tube 22 is furnished with a conventional electron gun 24, supplied with a filament source 25 and an accelerating potential source 26. Between the cathode and the plate in this tube is a conventional control grid 27. The connection to this control grid is shown brought out through the side of the tube 22, merely for the purpose of convenience in representation. Normally this lead is brought out through the base of the tube. Leads 28, which connect to the cathode and control grid of the electron gun 24, are connected at the other end to the output of amplifier 21 through a source of bias potential 29, so that normally no electron beam passes through the electron gun 24; however, whenever a signal appears across the resistor 20 due to the electron beam 17 momentarily impinging on an illuminated spot on the mosaic 16, the negative bias applied to the control grid 27 in electron gun 24 is sharply reduced, thus permitting an electron beam 30 of substantial current to be formed. The deflection system applied to the electron beam 30 is connected to the beam drive circuit 18, so that the motions of electron beams 17 and 30 are synchronized. Thus, at the instant shown, while electron beam 17 is scanning the region in which the spot from the third galvanometer 14 must lie, electron beam 30 is moving simultaneously across the third of five regions on the connector screen 23.

Connector screen 23, as is shown in Figure 2, is composed of an insulated backing plate 31 on which are mounted a series of rows of conducting electrodes 32. Each of these electrodes or electron collectors is insulated from the other electron collectors. The number of rows of such collectors is chosen to be equal to the number of galvanometers 14. Each electron collector 32 is connected in turn through a separate insulated lead 33 and through an insulated wire in one of the multiconductor cables 36 to one contactor 34 mounted on an insulated strip 35. These contactors are arranged in a plurality of sets, all sets being preferably aligned on the same straight line. The number of contactors in each set is equal to the number of electron collectors 32 on one row of the connector screen 23, and the connections ordinarily are so made that the first electron collector in any row is connected to the first contactor 34 in any set, and so on. The sets are preferably separated by a distance which is greater than the separation between adjacent contactors 34 in one set.

However, if desired, all of the contactors 34 can be equally spaced in a row instead of in separated sets, and the collectors 32 may be interconnected between rows as shown in Figure 5 so that each recorded trace will not be limited to a small range in amplitude, but some overlapping may occur. This will require more collectors per row on collector screen 23, but will not require any more leads 33 brought out from the tube 22. Thus, instead of employing, for example, eight collectors per row, sixteen or more collectors can be used in each row and connected internally. Thus, as is illustrated by Figure 5, only the first eight collectors in each row of sixteen are brought out to contactors 34, the additional collectors in each leading row being internally connected within tube 22 to the eight collectors of the trailing row which are brought out to contactors 34. That is, the ninth collector of the leading row is connected with the first in the trailing row, the tenth in the leading row with the second in the trailing row, and so forth.

The contactors are all arranged to bear against one surface of a strip of voltage-sensitive paper 37, which preferably is "Teledeltos" paper. On the opposite side of this strip, and similarly bearing against the paper, is located the conducting backing plate 38. This conducting backing plate is connected to the negative pole of a source of voltage 39. Across this source of voltage are connected a condenser 40 and a high resistance 41 in series. The midpoint between condenser 40 and resistance 41 is connected to a screen 42 in tube 22. This screen is therefore positively charged to a high potential relative to the collectors 32.

The collectors 32 are treated or processed in a manner well known in the art so that they have high secondary-emissive surfaces exposed to the electron stream 30. Methods of accomplishing this are taught in the Zworykin and Morton reference given above. Thus, when the electron beam 30 impinges on a collector, there is relatively intense flow of electrons from this selected collector to the screen 42, discharging condenser 40 through the corresponding contactor 34 and backing plate 38. At this instant a dot is produced on the surface of the "Teledeltos" strip.

The strip 37 or chart is moved past the contactors 34, in a direction which is approximately at right angles to the alignment of the contactors 34, by winding this strip on a take-up reel 43, which may be driven conventionally by a motor 44.

The electron collectors 32 are disposed close together, and the diameter of the beam of electrons 30 as it strikes the connector screen 23 is large enough so that as long as the electron beam is produced it must strike at least one electron collector 32 at a time. Were it not for the action of the control grid 27, the electron beam 30 would actuate each contactor 34 in turn, thus producing a series of dots on the moving voltage-sensitive strip 37 in the shape of diagonal straight lines. However, it is to be remembered that control grid 27 normally prevents a substantial electron beam 30 from forming, and it is only when electron beam 17 is scanning the light spot on the mosaic 16, which has been reflected from a galvanometer mirror in one of the galvanometers 14, that this electron beam 30 is produced. Accordingly, beam 30 is produced only once during the time that the electron beam 17 scans each zone or region of possible deflection of one light spot on the mosaic 16. Thus beam 30 acts as a practically inertialess arm in a selector switch connecting once each scanning period an electron collector 32 to screen 42 and thereby closing a circuit including a contactor 34.

With this system, one selected contactor 34 out of each set of contactors is actuated during each scanning period, the location of this contactor being determined by the degree of deflection of the corresponding galvanometer element. There is a particular advantage in the system shown in this figure, in that the electron beams 17 and 30 possess practically no inertia and, therefore, the switching and scanning system can operate with extreme rapidity. It is possible by this system to scan the deflections of each of the plurality of galvanometers within an extremely small interval of time, so that the scanning for any particular galvanometer beam need not take more than 0.0001 second for example.

The use of this system permits the making of a recording of the output of one or a plurality of galvanometers directly (that is without the use of photographic means), although the galvanometer deflections are varying rapidly over a comparatively wide angle. The cost of chemicals and labor for development are eliminated and the study of the record can be made as soon as the record is produced. The resulting records are also more permanent than many photographically produced records obtained at the present time, since they do not depend on the thoroughness with which the record was fixed and washed. Such a record system, when used in the field, also saves a large amount of space now necessary in seismograph recording units or the like which is occupied by developing tanks, water tanks, hot water systems, etc. The saving in cost of this equipment and saving in time is immediately apparent.

In Figure 4 is shown a switching system alternative to that illustrated in the lower part of Figure 1. Here the electron collectors 32 are similarly mounted on a backing plate 31 which is fixed in a tube 22 (shown in top view) of the sort illustrated in Figure 1, but in this case the screen 42 shown in Figure 1 is not employed. Each collector 32 is connected to the cathode of a grid-glow or gaseous discharge tube, such as tubes 45, 46, 47 shown in Figure 4. These tubes are preferably but not necessarily of the cold cathode type, such as the 0A4G type.

Between the cathodes and grids of the tubes are connected grid resistors 48, 49, 50, while the anodes are each connected to one side of condensers 51, 52, 53. The other terminals of condensers 51, 52, 53 are connected to the cathodes of tubes 45, 46, 47 through contactors 34' fixed in an insulation strip 35', similar to contactors 34 and strip 35, respectively, and placed on the opposite side of chart 37 therefrom. Voltage from a source 39 is applied across condensers 51, 52, 53 through high resistances 54, 54', 55, 55', 56, and 56', the positive side of source 39 being connected to the anode sides of condensers 51, 52, 53.

When the electron beam 30 is switched on by the apparatus shown in the upper part of Figure 1, the collector 32 on which it impinges receives a negative charge which is immediately transferred to the cathode of the glow tube to which it is connected, causing that tube to conduct current. This discharges the corresponding one of the condensers 51, 52, 53 rapidly through the voltage-sensitive paper 37, producing the recording dot. The discharged condenser is recharged from source 39 through the resistances in series therewith, so that it will again produce a recording dot if the electron beam 30 is again switched on at the same collector 32 in the succeeding scanning cycle. Each spot is, of course, located on the strip or chart 37 in accordance with the position of the light beam from the corresponding galvanometer 14 of Figure 1.

Although for purposes of illustration only three glow-tube circuits are shown, it will be understood that ordinarily there will be one such tube and circuit for each contactor 34 and 34'. Further, it will be apparent that in some applications of this invention the resistors 54', 55', 56' may be omitted and the cathode terminals of condensers 51, 52, 53 tied together and connected to the negative pole of source 39 and to a single backing plate like that shown at 38 in Figure 1. However, where it is desired to keep at a minimum cross-feed between glow-tube circuits, which might occasionally cause discharging of more than one tube at a time, the wiring scheme shown in Figure 4, where the circuits are practically isolated from each other except for source 39, may be preferable.

It is often desirable to impress upon the record as it is being made, a plurality of timing marks which are spaced at uniform intervals of time. This may be accomplished in the systems disclosed in Figure 1 or 4 by application of the principles already described. One illustration of such a system is shown in Figure 3. Closely adjacent the alignment of contactors 34 is a second alignment of contactors 60. These contactors 60 are all connected together and may be in contact with each other at the strip 37, i. e. the series of contactors 60 may be replaced if desired by a single long knife-edge touching the paper strip 37. The contactors 60 are all connected to a single point 61 which is adapted to make connection to any one of a plurality of conducting arms on a timing wheel 62. This timing wheel is driven at a very constant speed, for example 10 revolutions per second, by conventional means now well known in the art. This timing wheel 62 is maintained at a potential above ground by a source of potential 63. Thus, whenever contact 61 is connected to one of the arms on toothed wheel 62, the contactor or contactors 60 is raised to a potential above ground and a series of aligned dots across the chart, or a single line (if a knife-edge contact is used) is produced on the paper. In the embodiment shown, where toothed wheel 62 is driven at 10 revolutions per second, there are 10 arms which are equally spaced around the periphery of the wheel so that a mark is made on the paper every 0.01 second. Preferably two of the arms are arranged to have extended contact with contact 61, so that every fifth mark is of longer duration than the others and every tenth mark is still further increased in length. It is also possible to mount contactors 60 on the same line and in between the line of contactors 35.

Many contemplated modifications and variations of the described invention will become apparent to those skilled in the art without departing from the spirit and scope of my invention. Therefore it should be understood that the described embodiments of my invention are for illustration only, the invention being defined by the appended claims.

I claim:

1. Apparatus for recording a plurality of electric currents on a moving, voltage-sensitive record chart comprising: a light source, a plurality of galvanometers actuated by said currents and having mirrors forming light from said source into beams moving in a plurality of spaced parallel paths, a light-sensitive means intercepting said light beams including means for producing a first electron beam and adapted to generate electric signals upon the coincidences of the positions occupied by each of said beams with said first electron beam, a plurality of aligned electron collectors mounted in an evacuated envelope in parallel rows corresponding to said parallel paths, means for producing a second electron beam within said envelope, means for controlling the current in said second electron beam, said controlling means being actuated from said light-sensitive means whereby said second electron beam contains an appreciable current only upon the generation of said signals, means supplied with varying voltages directly from a single source for deflecting said first and second beams periodically and in synchronism respectively through said plurality of paths and rows, a plurality of spaced contactors in contact with one side of and aligned substantially perpendicularly to the direction of motion of said record chart, a conducting backing plate adapted to contact the opposite side of said chart and facing said aligned contactors, a source of potential including at least one condenser, a plurality of electric circuits each of which connects through said chart one of said contactors to said backing plate and electrical switching means connected directly in series between said at least one condenser and said stationary electrodes, whereby each of said circuits contains an individual switching means for causing a pulse of current in one only of said circuits when said second electron beam impinges on the corresponding one of said electron collectors, said current pulse being of predetermined amplitude and larger than the current in said second electron beam.

2. Apparatus for recording a plurality of electric currents on a moving, voltage-sensitive record chart comprising: a light source, a plurality of galvanometers each actuated by one of said currents and having means forming light from said source into beams moving in a plurality of spaced parallel paths, a light-sensitive means intercepting said light beams and including a photo-electric surface and means for producing a first electron beam and adapted to generate electric signals upon coincidences of said electron and said light beams on said surface, a plurality of aligned electron collectors each of which is adapted to produce a plurality of secondary electrons on impinging of an electron, and is mounted in an evacuated envelope in parallel rows corresponding to said parallel paths, means for producing a second electron beam within said envelope, means for controlling the current in said beam, said controlling means being actuated from said light-sensitive means whereby said second electron beam contains an appreciable current only upon the generation of said signals, means supplied with varying voltages directly from a single source for deflecting periodically and in synchronism said first and second electron beams respectively through said plurality of paths and rows, a plurality of closely spaced contactors insulated from each other in contact with one side of and aligned substantially perpendicular to the direction of motion of said record chart, a conducting backing plate adapted to contact the opposite side of said chart and facing said aligned contactors, a source of voltage including a discharge condenser the negative terminal of which is connected to said backing plate, a screen mounted in said envelope adjacent said collectors but insulated therefrom, said screen being connected to the positive terminal of said source of voltage, and a plurality of electric circuits each of which connects through said chart one of said contactors to said backing plate, said discharge condenser and said screen, whereby the passage of a pulse of secondary electrons of approximately predetermined amplitude through one of said circuits is initiated upon the flow of electrons in said second electron beam to the corresponding electron collectors.

3. Apparatus for recording a plurality of electric currents on a moving, voltage-sensitive record chart comprising: a scanning tube, means for generating a first electron beam in said tube, a plurality of galvanometers each connected to one source of said currents, a light source, said tube, said galvanometers and said light source being so oriented that light from said source is reflected from the mirrors of said galvanometers to form a plurality of spots of light on the photoelectric screen of said tube, the ranges of deflections of said spots defining a plurality of substantially parallel zones on said screen, one zone for each spot, the position of which within said zone depends directly on the value of the current applied to the corresponding galvanometer, a plurality of electric contactors insulated from each other aligned substantially perpendicular to the direction of motion of a chart and adapted to be in contact therewith, at least one conducting backing plate adapted to contact such chart opposite said aligned contactors, a source of voltage including a discharge condenser, an electron selector tube including an evacuated envelope, an electron gun producing a second electron beam in said envelope, means responsive to the output of said scanning tube for suppressing said second electron beam except at such instants as said first beam impinges on said screen at the location of one of said light spots, a plurality of electrodes equal in number to said contactors mounted on said selector tube in a number of rows equal to the number of said parallel zones and aligned with the second electron beam whereby an electric pulse is generated at any such electrode as said second beam is directed at such electrode, means in said scanning and said selector tubes connected directly to a single source of varying voltages for sweeping said first and second electron beams systematically and periodically in synchronism across said zones and said rows respectively, and stationary connector means responsive selectively to the pulse from each one of said electrodes for connecting a corresponding one only of said contactors through said chart to said backing plate and said condenser upon generation of said pulse and for producing in said one only of said contactors a current greater than that in said second electron beam, whereby a plurality of dots are produced upon said chart each of which corresponds in position with the deflection of one of said galvanometers once during each sweeping period of said electron beams.

4. Apparatus according to claim 3 in which said electrodes are mounted within said selector tube, said electrodes being adapted to produce secondary emission and in which said connector means comprises a screen mounted in said selector tube between said electron gun and said electrodes and closely adjacent said electrodes, said screen being connected to the positive terminal of said source, and said electrodes being connected singly in turn to said contactors.

5. Apparatus according to claim 3 in which said connector means comprises a plurality of grid-glow tubes equal in number to that of said electrodes, the cathodes of said tubes being connected singly in turn to said contactors, the anodes of said tubes being connected to the negative terminal of said source, and the grids of said tubes being connected singly in turn to said electrodes.

DANIEL SILVERMAN.

REFERENCES CITED

The following references are of record in the file of this patent:

UNITED STATES PATENTS

| Number | Name | Date |
|---|---|---|
| 688,783 | Keiley | Dec. 10, 1901 |
| 843,189 | Willis | Feb. 5, 1907 |
| 1,459,087 | Cox | June 19, 1923 |
| 1,901,876 | Lehde | Mar. 21, 1933 |
| 2,053,268 | Davis | Sept. 8, 1936 |
| 2,191,565 | Henroteau | Feb. 27, 1940 |
| 2,219,508 | Athy et al. | Oct. 29, 1940 |
| 2,265,216 | Wolf | Dec. 9, 1941 |
| 2,276,423 | Silverman | Mar. 17, 1942 |
| 2,291,476 | Kernkamp | July 28, 1942 |
| 2,301,199 | Bruce | Nov. 10, 1942 |
| 2,348,401 | Manzanera | May 9, 1944 |